(12) United States Patent
Chavis (10) Patent No.: US 7,607,693 B2
(45) Date of Patent: Oct. 27, 2009

(54) APPARATUS FOR BICYCLE

(76) Inventor: Randy Chavis, 500 S. Greensboro St. Lt. 26, Carrboro, NC (US) 27510

( * ) Notice: Subject to any disclaimer, the term of this patent is extended or adjusted under 35 U.S.C. 154(b) by 99 days.

(21) Appl. No.: 11/532,703

(22) Filed: Sep. 18, 2006

(65) Prior Publication Data

US 2008/0067765 A1    Mar. 20, 2008

(51) Int. Cl.
*B62H 1/10*    (2006.01)
(52) U.S. Cl. .................... 280/767; 280/87.041; 280/293
(58) Field of Classification Search ............ 280/87.01, 280/87.041, 87.042, 767, 288.4, 291, 293, 280/296, 239
See application file for complete search history.

(56) References Cited

U.S. PATENT DOCUMENTS

| | | |
|---|---|---|
| 3,284,096 A | 11/1966 | Hansen et al. |
| 3,653,679 A | 4/1972 | Howard |
| 3,888,511 A | 6/1975 | Parrilla |
| 3,961,810 A | 6/1976 | Arico |
| 4,012,054 A | 3/1977 | Moore |
| 4,153,268 A | 5/1979 | Wilson et al. |
| 5,242,183 A | 9/1993 | Oberg et al. |
| 5,330,221 A | 7/1994 | Sutton |
| 5,368,323 A | 11/1994 | Young |
| D366,636 S | 1/1996 | Smith |

FOREIGN PATENT DOCUMENTS

| | | |
|---|---|---|
| FR | 2492762 | 4/1982 |
| WO | WO 89/08043 | 9/1989 |

*Primary Examiner*—Christopher P Ellis
*Assistant Examiner*—Brian Swenson
(74) *Attorney, Agent, or Firm*—Michael G. Johnston; Moore & Van Allen PLLC (57) ABSTRACT

An apparatus for attaching to a bicycle, the apparatus comprising a support frame including a rearward portion and a pair of spaced members extending forwardly for receiving the rear wheel and for attachment to the rear wheel axle of the bicycle. A pair of angled brace members are each attached at one end to the support frame and extend forwardly and upwardly for attachment to the bicycle frame. A rear member is attached at one end to the support frame. An elongated platform is rigidly attached to the rearward end of the rear member such that the platform extends transversely of the longitudinal axis of the bicycle frame. A wheel assembly is attached to the platform. The wheel assembly is out of engagement with a surface upon which the bicycle is located when the front and rear wheels are in contact with the surface. The wheel assembly engages the surface at a point rearward of the bicycle upon rearward rotation of the bicycle by raising the front wheel of the bicycle from the surface.

42 Claims, 5 Drawing Sheets

APPARATUS FOR BICYCLE

BACKGROUND

This invention relates generally to an apparatus for a bicycle and, more particularly, to an apparatus for a bicycle for doing "wheelies" on the bicycle.

A common stunt performed by bicycle riders is doing "wheelies", wherein the rider balances the bike on the rear wheel while raising the front wheel off the ground. A variety of devices attachable to a bicycle have been provided for preventing the rider from tipping over backwards. Most of these devices include at least one wheel or a bar to prevent the bike from going backwards too far. Other devices aid in learning how to accomplish the feat of doing wheelies. However, few of the devices allow the rider to balance the bike in a "wheelie" position and also maneuver the bike effectively. Moreover, none of the devices allows a rider to balance the bicycle on the device while providing the capability of maneuvering the bicycle.

For the foregoing reasons, there is a need for an apparatus attachable to a bicycle for aiding in doing wheelies. The new apparatus should provide support and balance to the bicycle in the wheelie position, while allowing a rider to stand or kneel on the device for maneuvering the bicycle.

SUMMARY

According to the present invention, an apparatus is provided for attachment to a bicycle having a frame supporting a seat, a front wheel, and including rearwardly extending frame members forming a rear wheel axle support frame on each side of a rear wheel rotating on a rear axle. The apparatus comprises a rigid support frame comprising a rearward portion, and a pair of spaced members integral with the rearward portion and extending forwardly for receiving the rear wheel. Each of the spaced members include forward ends attachable to the rear wheel axle. A pair of angled brace members are each attached at one end to the support frame and extend forwardly and upwardly relative to the rearward portion of the support frame. The forward ends of the brace members are attachable to the bicycle frame. A rear member comprises a rearward end and a forward end attached to the rearward portion of the support frame. An elongated platform is rigidly attached to the rearward end of the rear member such that the platform extends transversely of the longitudinal axis of the bicycle frame. A wheel assembly comprising at least one wheel is attached to the platform such that the wheel rotates in parallel with the wheels of the bicycle. The wheel assembly is adapted to be out of engagement with a surface upon which the bicycle is located when the front and rear wheels are in contact with the surface. The wheel assembly engages the surface at a point rearward of the bicycle upon rearward rotation of the bicycle about an axis extending through the rear wheel axle by raising the front wheel of the bicycle from the surface.

BRIEF DESCRIPTION OF THE DRAWINGS

For a more complete understanding of the present invention, reference should now be had to the embodiment shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGS. Indeed, the components may be oriented in any direction and the terminology, therefore, should be understood as encompassing such variations unless specified otherwise.

Figure 1:
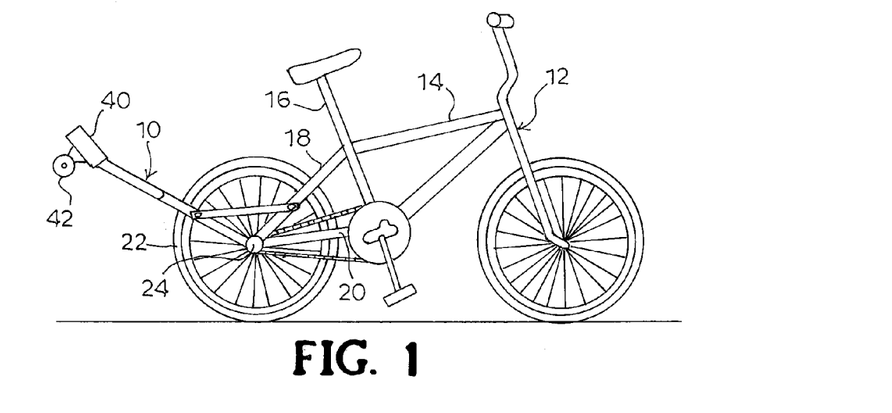
FIG. 1 is a right side elevational view of a bicycle to which an embodiment of an apparatus according to the present invention is attached.

Referring now to the drawings, wherein like reference numerals designate corresponding or similar elements throughout the several views, FIG. 1 shows an apparatus according to the present invention attached to a conventional bicycle and generally designated at 10. The bicycle 12 is of standard construction with a frame 14 including a vertical seat support member 16 and upper and lower frame members 18, 20. The frame members 18, 20 extend rearwardly on both sides of a rear wheel 22 rotating on a rear axle 24 for providing support to the rear axle 24.

Figure 2:
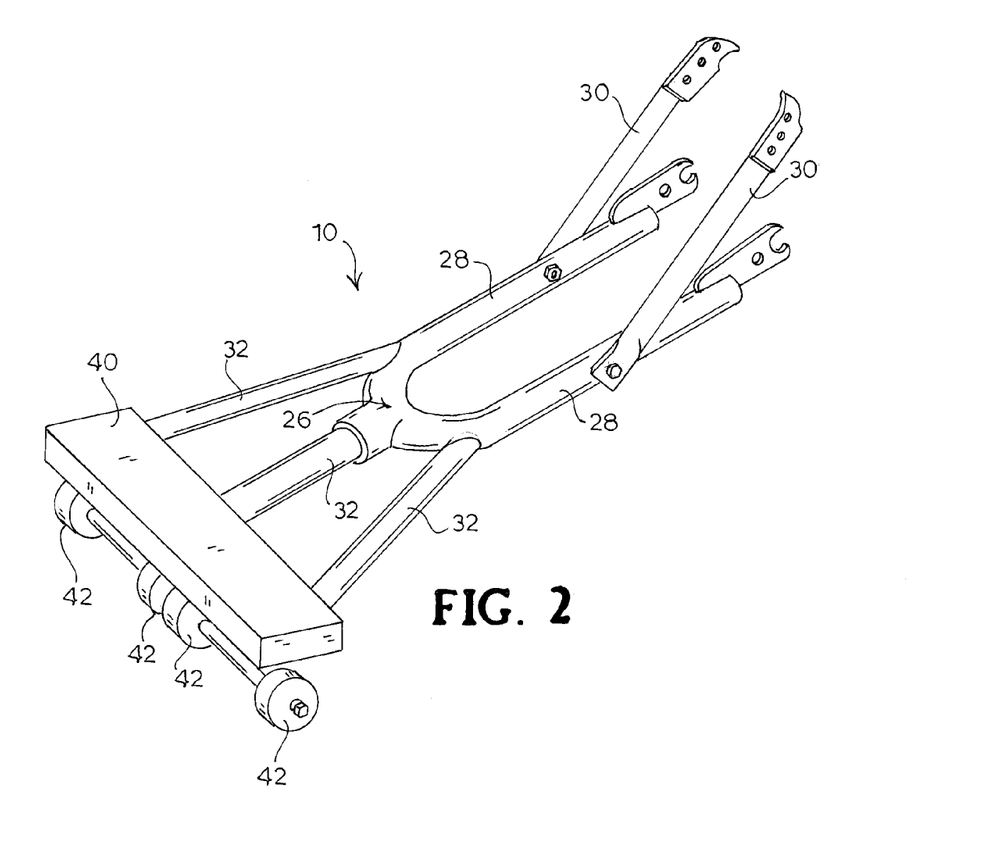
FIG. 2 is a perspective view of the apparatus shown in FIG. 1.
Figure 3:
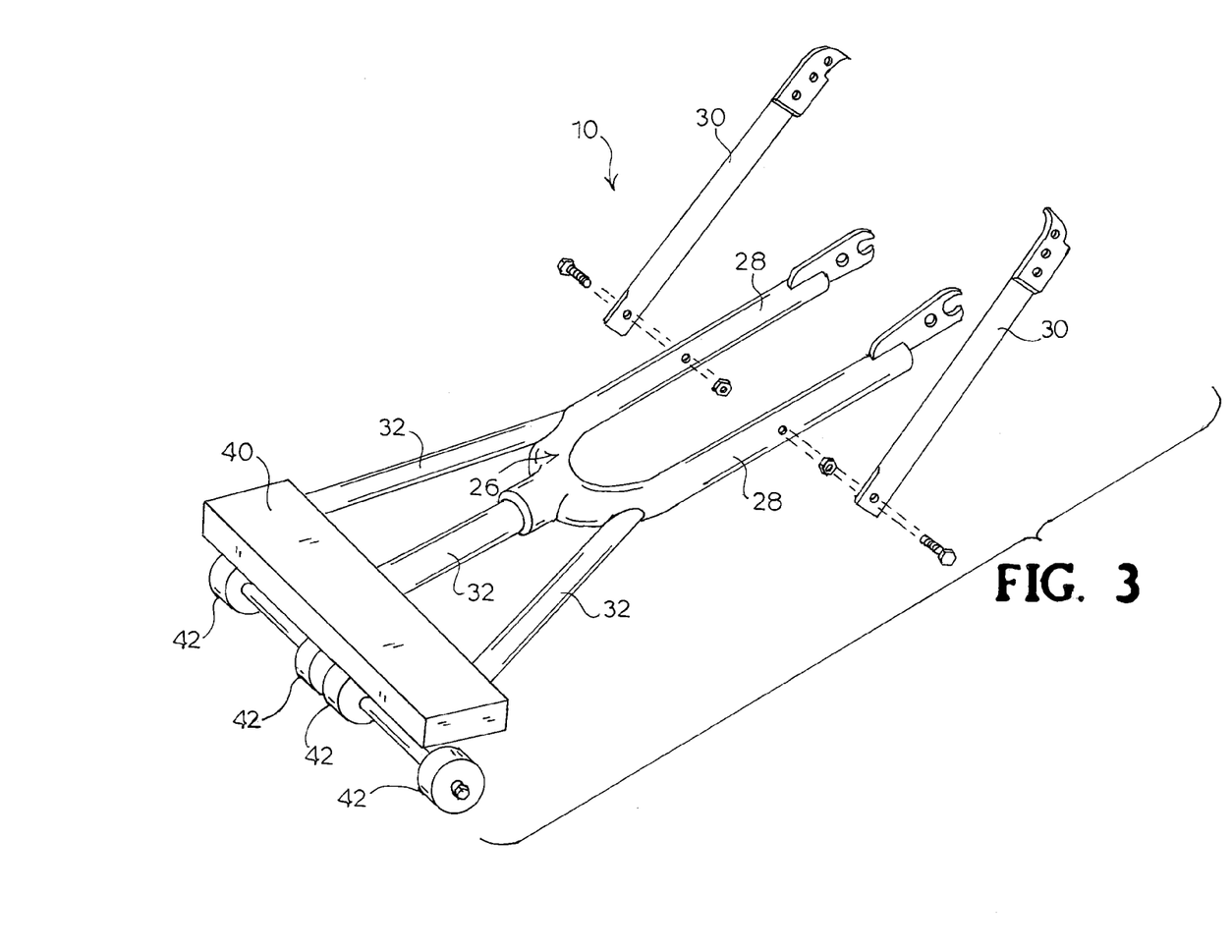
FIG. 3 is an exploded view of the apparatus as shown in FIG. 2.

Referring to FIGS. 2 and 3, the apparatus 10 is constructed of tubular steel members. Other materials may be used including, but not limited to, stainless steel, aluminum, galvanized aluminum, copper, azack board, airplane material, fiberglass, and the like. The scope of the invention is not intended to be limited by the materials listed here, but may be carried out using any material which allows the construction and operation of the apparatus described herein.

The steel members may be joined, unless otherwise noted, by standard welding techniques used, for example, in the construction of bicycle frames. The apparatus 10 comprises a rigid support frame 26 generally formed in a "U" shape, including two forwardly extending arms 28. Angled frame members 30 extend upwardly from the arms 28 of the support frame 26 in a forward direction. Opposed holes are provided intermediate along the length of the arms 28. Holes are also provided adjacent the ends of the angled frame members 30. The frame members 30 attach to the arms 28 using a bolt and nut combination secured through the holes in the arms 28 and frame members 30. This arrangement facilitates a pivoting connection between the arms 28 and the frame members 30 for securing the frame members 30 at a height adjustable position along the upper frame members 18 of the bicycle to accommodate different sizes and shapes of bicycle frames.

Three spaced transition frame members 32 are connected at their forward ends to the rearward section of the rigid support frame 26 to make the frame into an integral unit. The rearward ends of the transition frame members 32 are fixed to a surface of a horizontal platform 40.

Figure 4:
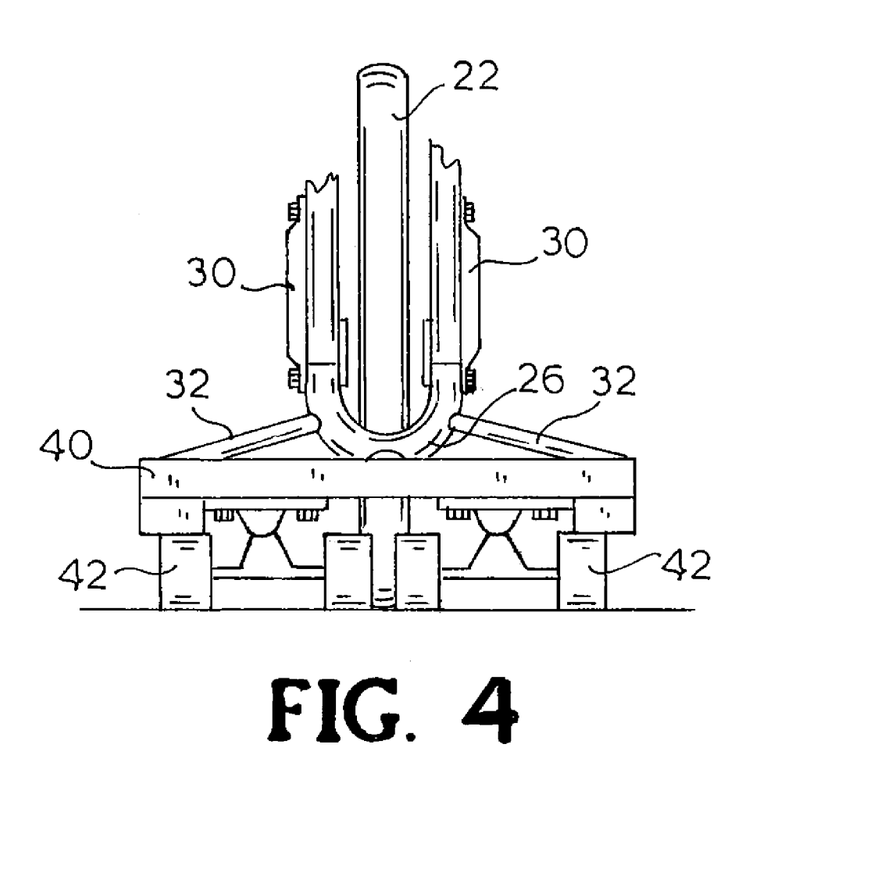
FIG. 4 is a close-up rear elevational view of the bicycle with the apparatus as shown in FIG. 1 balanced on the rear wheel and the apparatus.

As shown in FIG. 4, two wheel assemblies 42 are attached at spaced positions to the lower surface of the platform 40. Preferably, the wheel assemblies 42 are similar to those used on skateboards, which provide for flexibility of the axle both vertically and horizontally for preventing minor road imperfections from unduly effecting the balance of the bicycle 12. The diameter of the wheels are from about 2 to about 2½ inches, which is standard for skateboard wheels. Urethane skateboard wheels are suitable in this application. Alternatively, off-road type wheels comprising rubber inner tubes may be used.

The platform 40 is about 18 inches long. It is preferred that the outside edges of wheel assemblies 42 are from about five inches to about 16 inches apart and each wheel is about 1½ inches wide. This distance provides an excellent degree of balance without materially obstructing passing objects or the rider's feet when getting on and off the bicycle.

In use, the arms 28 of the support frame 26 are attached at each end to the bicycle frame at the rear axle 24 for forming an integral rigid support frame (FIG. 1). Thus, the support frame 26 extends rearwardly from the rear wheel axle 18 of the bicycle 12. The angled frame members 30 attach at their forward ends to the upper angled frame members 18 extending rearwardly from the vertical seat support member 16 of the bicycle frame 14. The connections at the rear axle 24 and the seat support member 16 are tightenable by bolt and nut combinations to structurally fix the rigid support frame 26 as an integral unit with the bicycle frame 14.

Figure 5:
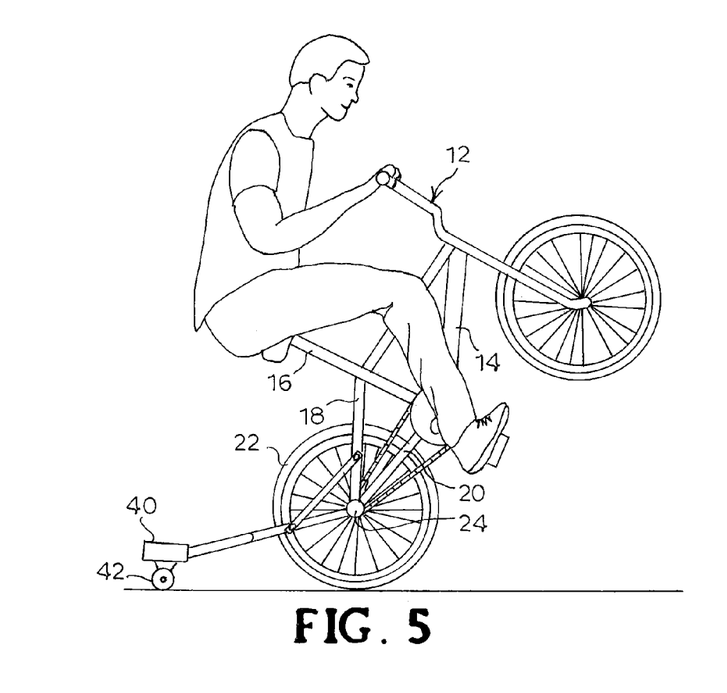
FIG. 5 is a right side elevational view of the bicycle with the apparatus as shown in FIG. 1 balanced on the rear wheel and the apparatus.
Figure 6:
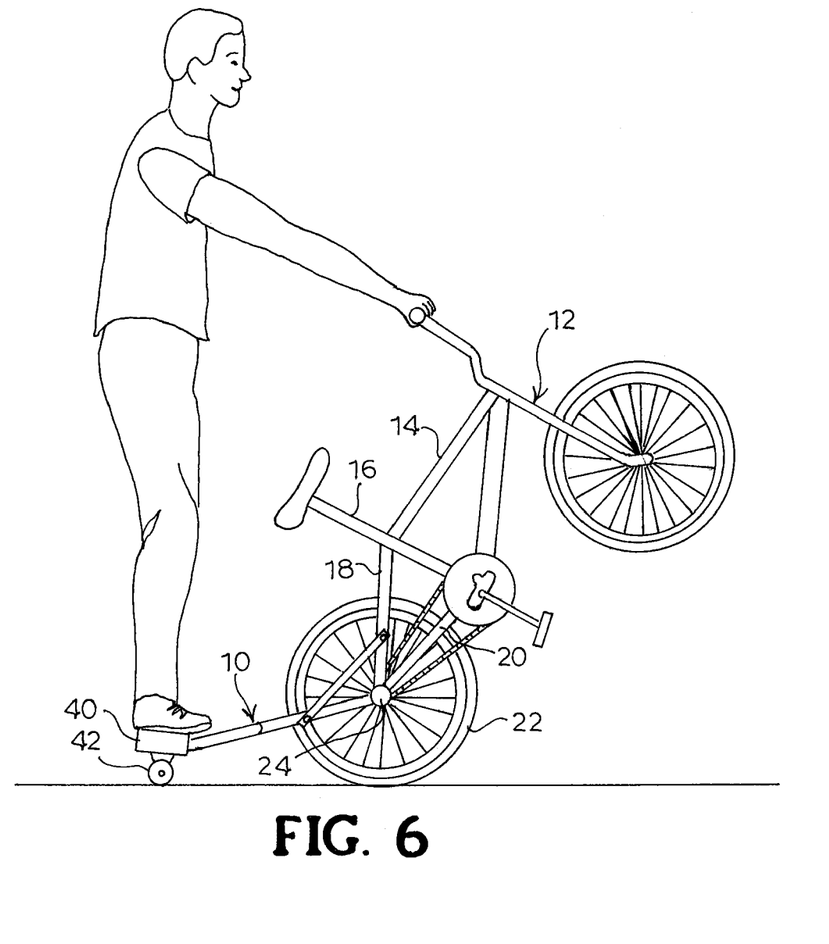
FIG. 6 is a right side elevational view of the bicycle with the apparatus as shown in FIG. 5 with a rider standing on the apparatus.

Referring to FIG. 5, the bicycle 12 is in a wheelie position while ridden balanced on the rear wheel 22 and the wheel assemblies 42 of the apparatus 10. As shown in FIG. 6, the dimensions of the apparatus 10 provide for effective steering and maneuverability of the bicycle 12 in the wheelie position. Further, the wheelie position may be maintained while the user stands on the platform 40. From this position, the user may direct the bicycle 12 through a series of creative maneuvers accomplished by steering the bicycle 12.

Although the present invention has been shown and described in considerable detail with respect to only a particular exemplary embodiment thereof, it should be understood by those skilled in the art that I do not intend to limit the invention to the embodiment since various modifications, omissions and additions may be made to the disclosed embodiment without materially departing from the novel teachings and advantages of the invention, particularly in light of the foregoing teachings. For example, the apparatus of the present invention may be used with different types of wheeled vehicles in addition to a bicycle, such as all terrain vehicles, motorcycles and the like. Accordingly, I intend to cover all such modifications, omissions, additions and equivalents as may be included within the spirit and scope of the invention as defined by the following claims. In the claims, means-plus-function clause(s) are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

I claim:

1. An apparatus attachable to a bicycle having a frame supporting a seat, a front wheel, and including rearwardly extending frame members forming a rear wheel axle support frame on each side of a rear wheel rotating on a rear axle, the apparatus comprising:

a rigid support frame comprising a rearward portion, and a pair of spaced members integral with the rearward portion and extending forwardly for receiving the rear wheel, each of the spaced members including forward ends attachable to the rear wheel axle;

a pair of angled brace members each attached at one end to the support frame and extending forwardly and upwardly relative to the rearward portion of the support frame, the forward ends of the brace members attachable to the bicycle frame;

a rear member comprising a rearward end and a forward end attached to the rearward portion of the support frame;

an elongated platform rigidly attached to the rearward end of the rear member such that the platform extends transversely of the longitudinal axis of the bicycle frame; and a wheel assembly comprising at least one wheel, the wheel assembly attached to the platform such that the wheel rotates in parallel with the wheels of the bicycle, wherein the wheel assembly is adapted to be out of engagement with a surface upon which the bicycle is located when the front and rear wheels of the bicycle are in contact with the surface, and wherein the wheel assembly engages the surface at a point rearward of the bicycle upon rearward rotation of the bicycle about an axis extending through the rear wheel axle by raising the front wheel of the bicycle from the surface.

2. The apparatus recited in claim 1, wherein the at least one wheel is about 1½ inches wide.

3. The apparatus recited in claim 1, wherein the diameter of the at least one wheel is from about 1 to about 6 inches.

4. The apparatus recited in claim 1, further comprising a second wheel assembly including at least one wheel and mounted on the platform, the first and second wheel assemblies being spaced apart and mounted at opposite ends of the platform.

5. The apparatus recited in claim 4, wherein each wheel comprises an outside vertical edge, said edges being distanced from each other from about five to about sixteen inches.

6. The apparatus recited in claim 1, wherein the platform is at least about 12 inches long.

7. The apparatus recited in claim 1, wherein the brace members extend in substantially parallel relationship on opposite sides of the rear wheel.

8. The apparatus as recited in claim 1, wherein the pair of angled brace members are each pivotally attached at the one end to the rigid support frame.

9. The apparatus recited in claim 1, wherein the platform is at least about 18 inches long.

10. An apparatus attachable to a bicycle having a frame supporting a seat, a front wheel, and including rearwardly extending frame members forming a rear wheel axle support frame on each side of a rear wheel rotating on a rear axle, the apparatus comprising:

a rigid support frame comprising a rearward portion, and a pair of spaced members integral with the rearward portion and extending forwardly for receiving the rear wheel, each of the spaced members including forward ends attachable to the rear wheel axle;

a brace member attached at one end to the rigid support frame and extending forwardly and upwardly relative to the rearward portion of the rigid support frame, the forward end of the brace member attachable to the bicycle frame;

a rear member comprising a rearward end and a forward end attached to the rearward portion of the rigid support frame;

an elongated platform rigidly attached to the rearward end of the rear member such that the platform extends transversely of the longitudinal axis of the bicycle frame; and a wheel assembly comprising at least one wheel, the wheel assembly attached to the platform such that the wheel rotates in parallel with the wheels of the bicycle, wherein the wheel assembly is adapted to be out of engagement with a surface upon which the bicycle is located when the front and rear wheels of the bicycle are in contact with the surface, and wherein the wheel assembly engages the surface at a point rearward of the bicycle upon rearward rotation of the bicycle about an axis extending through the rear wheel axle by raising the front wheel of the bicycle from the surface.

11. An apparatus attachable to a bicycle as recited in claim 10, wherein the brace member is attached at one end to one of the spaced members.

12. The apparatus attachable to a bicycle as recited in claim 10, wherein the at least one wheel is about 1½ inches wide.

13. The apparatus attachable to a bicycle as recited in claim 10, wherein the diameter of the at least one wheel is from about 1 to about 6 inches.

14. The apparatus attachable to a bicycle as recited in claim 10, further comprising a second wheel assembly including at least one wheel and mounted on the platform, the first and second wheel assemblies being spaced apart and mounted at opposite ends of the platform.

15. The apparatus attachable to a bicycle as recited in claim 14, wherein each wheel comprises an outside vertical edge, said edges being distanced from each other from about five to about sixteen inches.

16. The apparatus attachable to a bicycle as recited in claim 10, wherein the platform is at least about 12 inches long.

17. The apparatus attachable to a bicycle as recited in claim 10, wherein the brace member is pivotally attached at the one end to the rigid support frame.

18. The apparatus attachable to a bicycle as recited in claim 10, wherein the platform is at least about 18 inches long.

19. An apparatus attachable to a bicycle having a frame supporting a front wheel, and including rearwardly extending frame members forming a rear wheel axle support frame on each side of a rear wheel rotating on a rear axle, the apparatus comprising:

a rigid support frame comprising a proximal end and a distal end, the distal end of the rigid support frame attachable to the bicycle frame;

an elongated platform attached to the proximal end of the rigid support frame such that a portion of the platform extends substantially transversely on each side of the longitudinal axis of the bicycle frame; and a plurality of wheels operatively connected to the platform such that at least one wheel is positioned on both of the portions of the platform and substantially spaced from the longitudinal axis of the bicycle frame, and such that the wheels rotate in parallel with the front and rear wheels of the bicycle, wherein the wheels are adapted to be out of engagement with a surface upon which the bicycle is located when the front and rear wheels of the bicycle are in contact with the surface, and wherein the wheels engage the surface at a point rearward of the bicycle upon rearward rotation of the bicycle about an axis extending through the rear wheel axle by raising the front wheel of the bicycle from the surface.

20. An apparatus attachable to a bicycle as recited in claim 19, further comprising a brace member having a proximal end and distal end, the proximal end of the brace member attached to the rigid support frame such that the brace member extends angularly from the rigid support frame for attachment of the distal end of the brace member to the bicycle frame.

21. The apparatus attachable to a bicycle as recited in claim 20, wherein the brace member is pivotally attached at the one end to the rigid support frame.

22. The apparatus attachable to a bicycle as recited in claim 19, wherein the plurality of wheels are about 1½ inches wide.

23. The apparatus attachable to a bicycle as recited in claim 19, wherein the diameter of the plurality of wheels is from about 1 to about 6 inches.

24. The apparatus attachable to a bicycle as recited in claim 19, wherein the at least one wheel positioned on both of the portions of the platform comprises an outside vertical edge, said edges being distanced from each other from about five to about sixteen inches.

25. The apparatus attachable to a bicycle as recited in claim 19, wherein the platform is at least about 12 inches long.

26. The apparatus attachable to a bicycle as recited in claim 19, wherein the platform is at least about 18 inches long.

27. A bicycle comprising:

a frame supporting a seat, a front wheel, and including rearwardly extending frame members forming a rear wheel axle support frame on each side of a rear wheel rotating on a rear axle;

a rigid support frame comprising a rearward portion, and a pair of spaced members integral with the rearward portion and extending forwardly for receiving the rear wheel, each of the spaced members including forward ends attachable to the rear wheel axle;

a brace member attached at one end to the rigid support frame and extending forwardly and upwardly relative to the rearward portion of the rigid support frame, the forward end of the brace member attached to the bicycle frame;

a rear member comprising a rearward end and a forward end attached to the rearward portion of the rigid support frame;

an elongated platform rigidly attached to the rearward end of the rear member such that the platform extends transversely of the longitudinal axis of the bicycle frame; and a wheel assembly comprising at least one wheel, the wheel assembly attached to the platform such that the wheel rotates in parallel with the wheels of the bicycle, wherein the wheel assembly is adapted to be out of engagement with a surface upon which the bicycle is located when the front and rear wheels of the bicycle are in contact with the surface, and wherein the wheel assembly engages the surface at a point rearward of the bicycle upon rearward rotation of the bicycle about an axis extending through the rear wheel axle by raising the front wheel of the bicycle from the surface.

28. A bicycle as recited in claim 27, wherein the at least one wheel is about 1½ inches wide.

29. A bicycle as recited in claim 27, wherein the diameter of the at least one wheel is from about 1 to about 6 inches.

30. The bicycle as recited in claim 27, further comprising a second wheel assembly including at least one wheel and mounted on the platform, the first and second wheel assemblies being spaced apart and mounted at opposite ends of the platform.

31. The bicycle as recited in claim 30, wherein each wheel comprises an outside vertical edge, said edges being distanced from each other from about five to about sixteen inches.

32. The bicycle as recited in claim 27, wherein the platform is at least about 12 inches long.

33. The bicycle as recited in claim 27, wherein the brace member is pivotally attached at the one end to the rigid support frame.

34. The bicycle as recited in claim 27, wherein the platform is at least about 18 inches long.

35. A bicycle comprising:
   a frame supporting a front wheel, and including rearwardly extending frame members forming a rear wheel axle support frame on each side of a rear wheel rotating on a rear axle;
   a rigid support frame comprising a proximal end and a distal end, the distal end of the rigid support frame attached to the bicycle frame;
   an elongated platform attached to the proximal end of the rigid support frame such that a portion of the platform extends substantially transversely on each side of the longitudinal axis of the bicycle frame; and
   a plurality of wheels operatively connected to the platform such that at least one wheel is positioned on both of the portions of the platform and substantially spaced from the longitudinal axis of the bicycle frame, and such that the wheels rotate in parallel with the front and rear wheels of the bicycle,
wherein the wheels are adapted to be out of engagement with a surface upon which the bicycle is located when the front and rear wheels of the bicycle are in contact with the surface, and wherein the wheels engage the surface at a point rearward of the bicycle upon rearward rotation of the bicycle about an axis extending through the rear wheel axle by raising the front wheel of the bicycle from the surface.

36. The bicycle as recited in claim 35, wherein the plurality of wheels are about 1½ inches wide.

37. The bicycle as recited in claim 35, wherein the diameter of the plurality of wheels is from about 1 to about 6 inches.

38. The bicycle as recited in claim 35, wherein the at least one wheel positioned on both of the portions of the platform comprises an outside vertical edge, said edges being distanced from each other from about five to about sixteen inches.

39. The bicycle as recited in claim 35, wherein the platform is at least about 12 inches long.

40. The bicycle as recited in claim 35, further comprising a brace member having a proximal end and distal end, the proximal end of the brace member attached to the rigid support frame such that the brace member extends angularly from the rigid support frame for attachment of the distal end of the brace member to the bicycle frame.

41. The bicycle as recited in claim 40, wherein the brace member is pivotally attached at the one end to the rigid support frame.

42. The bicycle as recited in claim 35, wherein the platform is at least about 18 inches long.

* * * * *

UNITED STATES PATENT AND TRADEMARK OFFICE
CERTIFICATE OF CORRECTION

| | | |
|---|---|---|
| PATENT NO. | : 7,607,693 B2 | Page 1 of 1 |
| APPLICATION NO. | : 11/532703 | |
| DATED | : October 27, 2009 | |
| INVENTOR(S) | : Randy Chavis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 138 days.

Signed and Sealed this

Twelfth Day of October, 2010

David J. Kappos
*Director of the United States Patent and Trademark Office*